United States Patent
Becker et al.

(10) Patent No.: US 9,591,112 B2
(45) Date of Patent: Mar. 7, 2017

(54) COMMAND QUEUING FOR MULTIMEDIA STORAGE DEVICES

(75) Inventors: Christopher Becker, Palatine, IL (US); Michael Doll, Gurnee, IL (US); Joseph Hansen, Williams Bay, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 2432 days.

(21) Appl. No.: 10/335,139

(22) Filed: Dec. 31, 2002

(65) Prior Publication Data

US 2004/0127255 A1    Jul. 1, 2004

(51) Int. Cl.
*H04M 1/02* (2006.01)
*H04L 12/861* (2013.01)
*G06F 1/16* (2006.01)
*H04B 1/3816* (2015.01)

(52) U.S. Cl.
CPC ............ *H04M 1/0274* (2013.01); *G06F 1/16* (2013.01); *H04B 1/3816* (2013.01); *H04L 49/90* (2013.01)

(58) Field of Classification Search
CPC ..... G11C 29/16; G11C 2216/30; G06F 21/77; G06Q 20/341; H04L 63/0853; H04M 1/72522; H04M 1/72527
USPC .... 455/557, 403; 710/71, 301; 711/103, 115
See application file for complete search history.

(56) References Cited

U.S. PATENT DOCUMENTS

| | | | |
|---|---|---|---|
| 4,931,950 A | 6/1990 | Isle et al. | |
| 4,942,553 A | 7/1990 | Dalrymple | |
| 5,497,373 A | 3/1996 | Hulen et al. | |
| 5,663,901 A * | 9/1997 | Wallace et al. | 365/52 |
| 5,742,910 A | 4/1998 | Gallant et al. | |
| 5,790,786 A * | 8/1998 | Wakeman et al. | 709/249 |
| 6,092,133 A | 7/2000 | Erola et al. | |
| 6,097,733 A | 8/2000 | Basu et al. | |
| 6,378,011 B1 * | 4/2002 | Moore et al. | 710/71 |
| 6,388,919 B2 * | 5/2002 | Terasaki | 365/185.09 |
| 6,408,058 B1 * | 6/2002 | Lanet | 379/93.19 |
| 6,434,691 B2 * | 8/2002 | Murakami et al. | 712/205 |
| 6,466,804 B1 * | 10/2002 | Pecen et al. | 455/558 |
| 6,676,022 B1 | 1/2004 | Guthery et al. | |
| 6,792,501 B2 * | 9/2004 | Chen et al. | 711/103 |

(Continued)

FOREIGN PATENT DOCUMENTS

| | | | |
|---|---|---|---|
| EP | 0560343 A1 | 9/1993 | |
| EP | 1158416 A1 | 11/2001 | |

(Continued)

OTHER PUBLICATIONS

ARM; ARM PrimeCell Multimedia Card Interface (PL181) Technical Reference Manual; Copyright 2000, 2001 ARM Limited.

(Continued)

*Primary Examiner* — Matthew Sams
(74) *Attorney, Agent, or Firm* — Wolfe-SBMC

(57) ABSTRACT

A multi-media device interface (18) couples a multi-media device (16) to a portable electronic device (10). Multi-media and other information can be loaded into the portable electronic device (10) from the multi-media device (16) or stored in the multi-media device (16) from the portable electronic device (10). The multi-media device interface (18) queues commands to the multi-media device (16) from the portable electronic device (10) while the multi-media device (16) completes a previously-issued command.

20 Claims, 7 Drawing Sheets

(56) References Cited

U.S. PATENT DOCUMENTS

| | | | |
|---|---|---|---|
| 6,866,192 B2 | 3/2005 | Hosogoe et al. | |
| 6,886,083 B2* | 4/2005 | Murakami | 711/156 |
| 2001/0018735 A1 | 8/2001 | Murakami | |
| 2001/0037406 A1* | 11/2001 | Philbrick et al. | 709/250 |
| 2005/0232197 A1 | 10/2005 | Becker et al. | |
| 2005/0259640 A1 | 11/2005 | Becker et al. | |

FOREIGN PATENT DOCUMENTS

| | | |
|---|---|---|
| JP | 01-140276 | 6/1989 |
| JP | 01213774 | 8/1989 |
| JP | 03-042756 | 2/1991 |
| JP | 05128318 | 5/1993 |
| WO | 02/05202 A1 | 1/2002 |

OTHER PUBLICATIONS

ARM; ARM PrimeCell MMCI PL181 FAQS; Document No. PL181FAQ0000A; May 29, 2002; pp. 1-12.

Chinese Office Action; Chinese Patent Application No. 200380108045.0; dated May 8, 2009.

Japanese Office Action; Japanese Patent Application No. 2004-565485; dated Feb. 10, 2009.

U.S. Patent Office; Office Action for U.S. Appl. No. 11/166,450; dated Jan. 16, 2009.

U.S. Patent Office; Office Action for U.S. Appl. No. 11/166,450; dated Jul. 29, 2008.

U.S. Patent Office; Office Action for U.S. Appl. No. 11/167,041; dated Feb. 26, 2009.

U.S. Patent Office; Office Action for U.S. Appl. No. 11/167,041; dated Sep. 4, 2008.

Chinese Decision on Rejection; Chinese Patent Application No. 200380108045.0; dated Oct. 16, 2009.

Japanese Office Action; Japanese Patent Application No. 2004-565485; dated Oct. 30, 2009.

Indian Office Action; Indian Patent Application No. 1033/KOLNP/2005; dated Oct. 19, 2009.

* cited by examiner

COMMAND QUEUING FOR MULTIMEDIA STORAGE DEVICES

BACKGROUND OF THE INVENTION

Portable electronic devices such as cellular telephones and personal digital assistants are now available with the capability to present multimedia. Examples of multimedia include graphics or pictures, video, MP3 audio files, and combinations thereof.

The Multi-Media Card Association and the SD Association promote an industry-standard that specifies electrical and physical specifications for multi-media devices for use with portable communications equipment such as cellular telephones. When used with a cellular telephone, a so-called multi-media device can provide ring tones, games, pictures, video, audio files and the like. A problem with multi-media devices such as multi-media cards (hereafter referred to as multi-media devices), however, is that an electronic device to which they are coupled, can effectively slow down because of the rate at which commands to the multi-media devices are executed and the data rate at which information is sent to and received from such devices.

By way of example, in the prior art, a multi-media device interface couples a processor or other controller for a portable electronic device such as a portable radio or cellular phone, to a multi-media device. When the portable electronic device sends a command to the multi-media device, it passes through a multi-media device interface, which sends the data request to the multi-media device. If the controller for the portable device requests a data transfer, it will usually specify the amount of data that should be read as well. The multi-media device will send a response to the data request and begin sending data. The amount of data specified by the controller for the portable electronic device will be sent by the multi-media device. The ability to send commands to the multi-media device at any time would improve the performance of portable communications devices to which a multi-media device is coupled.

Another problem associated with data transfer, more specifically sending write data in a streaming mode to the multi-media storage device, is the synchronization of a stop data transmission command with the write data. For synchronization, once a stop data transmission command is executed, the multi-media storage device expects to receive a final six packets of write data, wherein a data packet is typically a byte of data.

Previous solutions to overcoming this limitation include the usage of a direct memory access (DMA) controller, which contains a control bit that is activated in response to the stop data transmission command. Once the control bit is activated, the DMA then writes the final six packets of write data stored in a FIFO buffer. Thereby, the DMA controller must keep track of the number of data packets being transferred and also must maintain a reserve of data packets for when the stop data transmission command is generated. Another such example of a multi-media interface controller requires pre-programming of the total number of write data packets to be written to the multi-media storage device, such as disclosed by an ARM PrimeCell multi-media interface card, available from ARM, Inc., which requires tracking of the write data so the timing of the stop data transmission command is properly aligned with the end of the write data provided to the multi-media storage device.

DETAILED DESCRIPTION OF THE PREFERRED EMBODIMENTS

Figure 1:
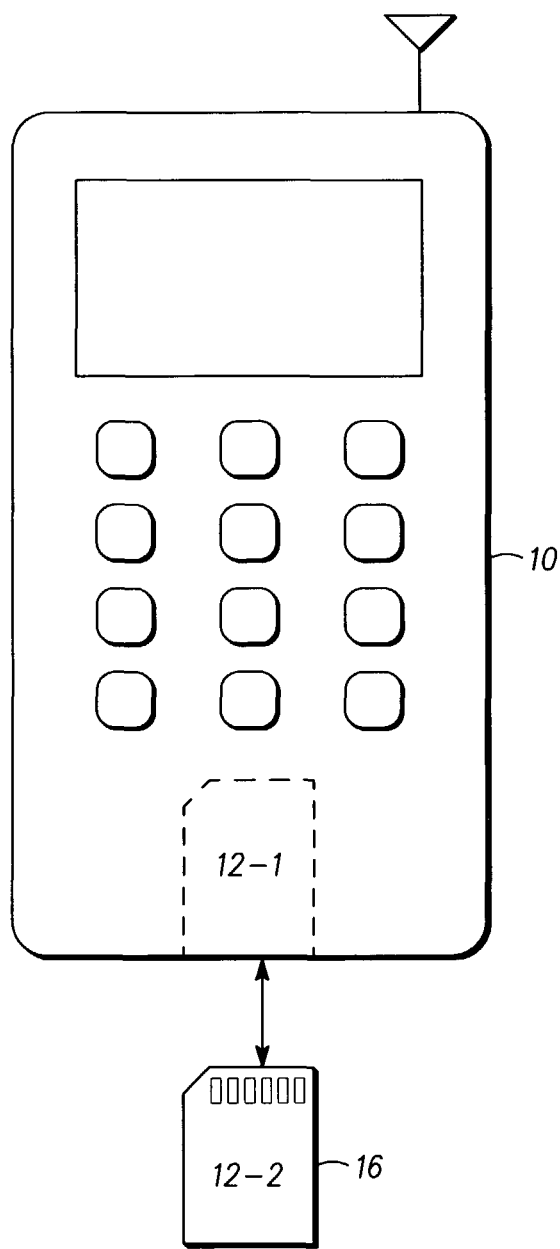
FIG. 1 shows a portable electronic device and a multi-media storage device in accordance with one embodiment of the invention.

FIG. 1 shows a portable electronic device 10 embodied as a cellular telephone and a multi-media storage device 16. The multi-media storage device 16 is preferably embodied as a circuit card 12-2. As shown in FIG. 1, the card 12-2 can be inserted into a mating receptacle 12-1 in the portable electronic device 10 where electrical contacts of the card 12-2 make electrical contact with complementary electrical contacts with the portable electronic device 10 but which are not shown in FIG. 1 for clarity.

For purposes of claim construction, the term "portable electronic device" should be construed to encompass all radio transmitter, radio receiver and transceiver devices that provide either one-way or two-way communications capability, regardless of the type of modulation (analog, CDMA, TDMA, GSM, et al.) or the frequency spectrum in which they operate (800 MHz., 900 MHz., and higher) but also including optical or infrared signals as well as acoustic signals. Examples of radio devices include two-way radios, pagers and GPS devices. The term "portable electronic device" should also be construed to include personal digital assistants (PDAs), MP3 players, digital cameras and "Internet appliance," which can include any device by which Internet access (web browsing, e-mail or other forms of packetized data) is sent and received. In a preferred embodiment, the portable electronic device 10 includes a radio device, such as a cellular telephone, which is considered to include the radio circuitry by which two-way communications can be provided.

With respect to a cellular telephone embodiment, the term "portable electronic device" includes the radio communications circuitry, i.e., the transmitter and/or receiver and/or transceiver, used in portable and mobile two-way cellular devices, regardless of the frequency spectrum in which such devices operate or the type of modulation they use.

Figure 2:
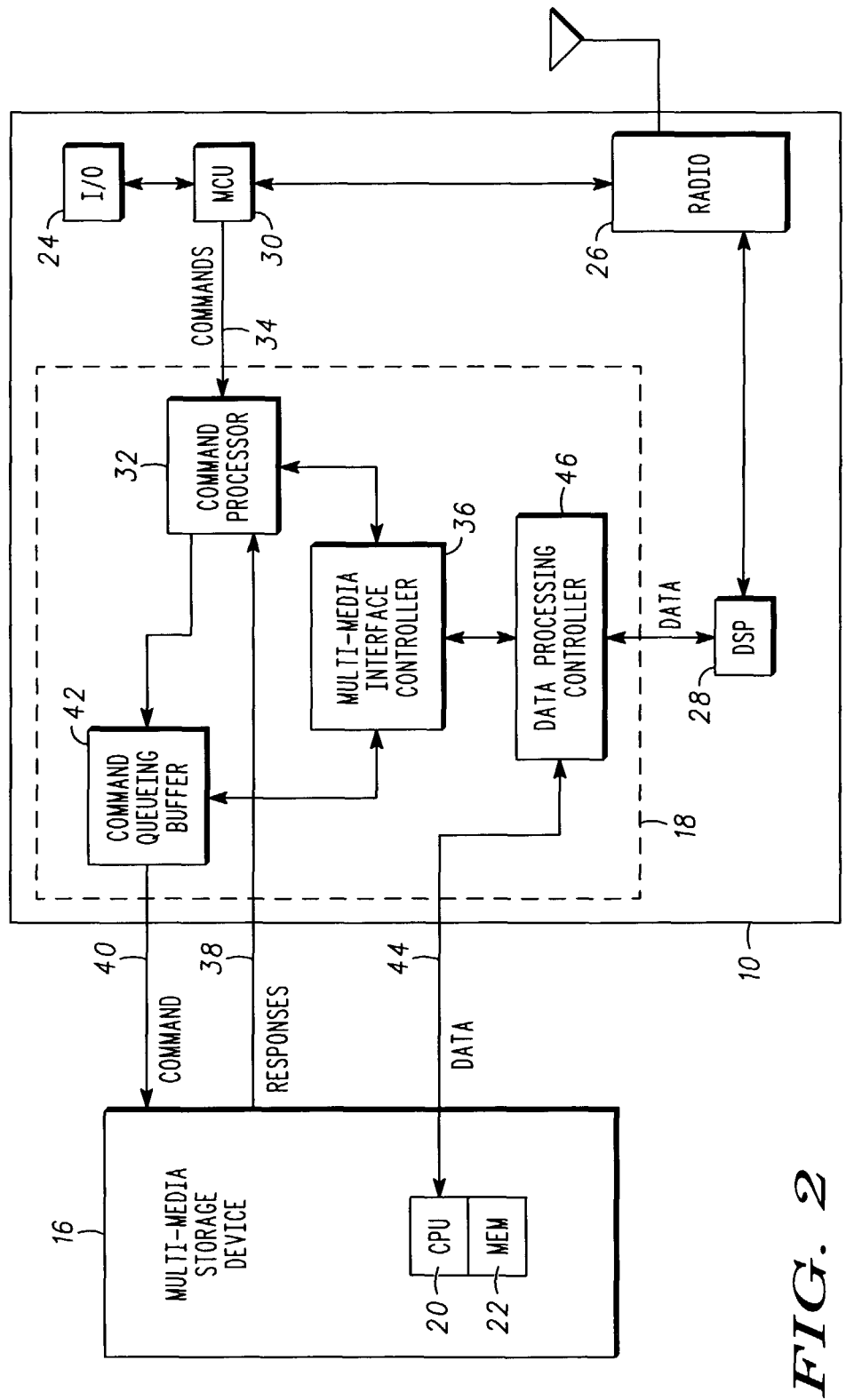
FIG. 2 shows one example of a multi-media device interface as part of a portable communications device in accordance with one embodiment of the invention and a multi-media storage device coupled to the multi-media device interface.

FIG. 2 shows a preferred embodiment of a multi-media device interface 18 (i.e., an interface for a multi-media device) as part of the portable electronic device 10. In FIG. 2, the portable electronic device 10 is a cellular telephone and includes a radio 26. For a cellular telephone, the radio 26 would include a radio transmitter/receiver or transceiver by which two-way communications would be provided.

The multi-media device interface 18 operatively couples the portable electronic device 10 to a multi-media storage device 16 (also referred to herein as a "multi-media device") so that the portable communications device can effectively send commands to the multi-media storage device 16 while the multi-media storage device 16 is sending data to the portable device 10.

In a preferred embodiment, a first processor 30 (hereafter the "MCU") of the portable electronic device 10 sends a command to the multi-media device 16, requesting a file. The MCU 30 will notify or inform a second processor 28, of the size of the file requested from the multi-media device 16. Thereafter, the second processor 28 will monitor data that it receives from the multi-media device 16.

Information-bearing signals, i.e., data signals, can be exchanged between (i.e., sent to and received from) the multi-media storage device 16 and the portable electronic device 10 according to specifications of the Multi-Media Card Association but also according to the SD Card Association Although the preferred embodiment of the invention transfers information between the multi-media storage device 16 and the portable electronic device 10 via electrical signals, alternate and equivalent methods of transferring information would include the use of infrared signals, acoustic, optical signals or radio frequency signals. Infrared data transmission techniques and circuitry, acoustic data transmission techniques and circuitry and RF data transmission techniques and circuitry, are well-known to those of ordinary skill in the art.

Figure 5:
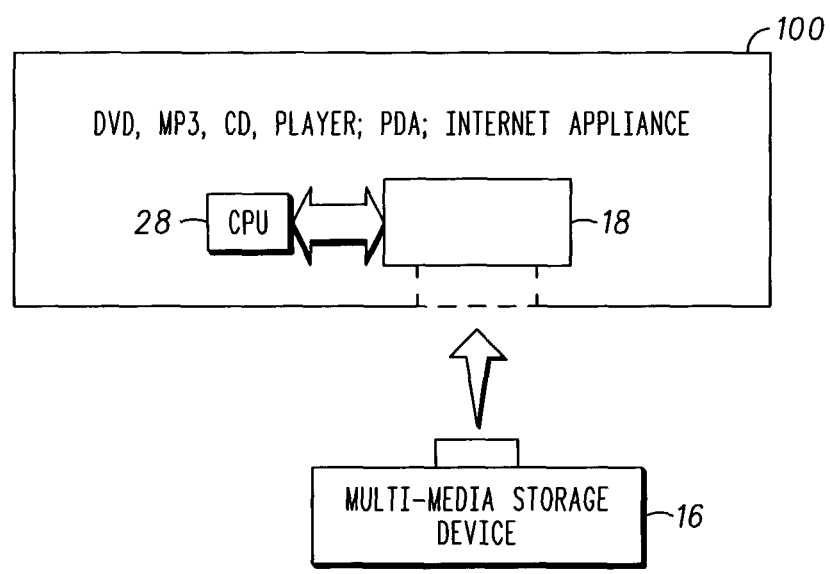
FIG. 5 shows one embodiment of a multi-media device interface with electronic devices.

By way of example, the multi-media storage device 16 might store audio files for use as ringer tones by the portable electronic device 10. The multi-media storage device 16 might also store pictures, video streams or MP3 audio files for playback on the portable electronic device 10 display screen, output from a speaker or other input/output (I/O) device 24 with which the portable electronic device 10 is equipped. An even more general embodiment of portable electronic device 10 includes devices identified in FIG. 5, which include devices such as a CD player, an MP3 player, a DVD player, an Internet appliance or a PDA, (all identified by reference numeral 100) which are equipped with the multi-media device interface 18 described herein.

As the file transfer from the multi-media storage device 16 proceeds, a second command can be issued to the multi-media storage device 16 from the MCU 30 whereupon the multi-media device interface 18 will receive the second command and store it in a command queuing buffer 42 (also known as "buffer 42") until such time that the multi-media storage device 16 can execute it.

The multi-media device interface 18 reduces processing overhead associated with data transfer between the multi-media storage device 16 and the portable electronic device 10. A principal function of the multi-media device interface 18 is to enable a processor in the portable electronic device 10 that is controlling the multi-media storage device 16, to issue commands to the multi-media storage device 16, even when the multi-media storage device 16 is unable to process them. In the embodiment shown in FIG. 2, the multi-media device interface 18 enables the MCU 30 to issue a first command to the multi-media storage device 16.

An example of a command to the multi-media storage device 16 would be to request the transfer of a file from the multi-media storage device 16 to the portable electronic device 10. During the time that the multi-media storage device 16 executes the first command, the multi-media device interface 18, enables the MCU 30 to issue another command to the multi-media storage device 16. The multi-media device interface 18 includes a command queuing buffer 42 where the second command is queued until the multi-media storage device 16 is able to execute the second command. In a preferred embodiment, a queued, i.e., "second" command will be executed by the multi-media storage device 16 after a previously-issued, i.e., "first" command is completed. The MCU 30 does not need to wait until one command to the multi-media storage device 16 has been executed before issuing another command.

In a preferred embodiment, the multi-media device interface 18 includes a command processor 32, which receives information 34 (commands, but also possibly including data) from at least one of the processors 28 or 30 of the portable electronic device 10. After the command processor 32 receives a command from the processor MCU 30, it forwards those commands to a multi-media interface controller 36, which can be embodied as a processor, such as a microcontroller or microprocessor as well as a DSP or combinational and/or sequential logic. The command processor 32 is preferably embodied as combinational logic, a gate array or an application specific integrated circuit.

In a preferred embodiment, the MCU forms a command by configuring registers in the command processor 32. The command processor 32 provides for error correction by way of a cyclic redundancy check or CRC, added to the commands issued to the multi-media storage device 16 from the MCU 30.

Commands to the multi-media storage device 16 are passed by the command processor 32. The multi-media interface controller 36 controls when the command is sent to the multi-media device 16. If the multi-media storage device 16 is capable of executing it, the multi-media interface controller 36 can forward a command directly to the multi-media storage device 16. The interface 36 also queues commands to the multi-media storage device 16 in the command queuing buffer 42.

The command processor 32 receives responses from the multi-media storage device 16 and validates those responses, typically by checking a cyclic redundancy check or CRC. attached to the response. The command processor 32 will notify the portable communications device controllers, that a response was received from the multi-media storage device 16 and that the multi-media storage device 16 is available to execute another command.

Another function of the multi-media interface controller 36 is to monitor the execution of the commands sent to the multi-media storage device 16. The multi-media interface controller 36 monitors the status or execution of commands by testing the responses 38 that are received from the multi-media storage device 16 in response to commands 40 that are sent to it.

The command queuing buffer 42, which is coupled to the command processor 32 as well as the multi-media face controller 36, stores commands to the multi-media device until they can be executed. In the preferred embodiment, the command queuing buffer 42 is embodied by 48-bit shift register. Commands can be written into the buffer 42 in parallel but shifted out in a serial fashion. Alternate embodiments include using a semi-conductor random access memory (RAM) device, however, in such an embodiment, sending information serially would require some sort of parallel-to-serial conversion.

As set forth above, the command queuing buffer 42 stores commands from the MCU 30 until such time the multi-media storage device 16 is able to execute them. The determination of when the multi-media storage device 16 can execute another command is determined in the second processor 28 notifying the MCU 30 that a previously-issued command has been completed.

By way of example, the controller/MCU 30 may request a file from the multi-media storage device 16. In order to do so, the controller/MCU 30 will issue a command that will be received by the command processor 32. The command processor can determine the status of the multi-media storage device 16 by monitoring current or most recent responses 38. If, for instance, the multi-media storage device responses 38 indicate that the multi-media storage device 16 is not busy, the command to send a file will be sent to the queuing buffer 42. The multi-media interface controller 36 can gate or transfer the command 40 to transfer a file from the multi-media storage device 16 by selecting the command from the queuing buffer 42 and causing the command queuing buffer 42 to write the command 40 to the multi-media storage device 16.

By tracking or monitoring the execution of commands sent to the multi-media storage device 16, the controller 36 substantially unburdens the controller/MCU 30 and the second processor (e.g., a DSP) 28 of the portable electronic device 10, freeing them to perform other tasks. The controller/MCU 30 does not need to wait until a data transfer is complete before issuing a command to the multi-media device 16.

Included within the multi-media device interface 18 is a data processing controller 46. The data processing controller 16 receives data 44 from the storage device 16 and converts it to an appropriate-sized parallel format. In instances where data must be sent to the multi-media storage device 16 from the portable electronic device 10, the data processing controller 46 can perform a parallel to serial conversion.

The data processing controller 46 includes an amount of random access memory, or RAM, into which, data from the multi-media storage device 16 can be stored pending the availability of the second processor/DSP 28 to transfer the data into the radio 26 or elsewhere in the portable electronic device 10.

Figure 3:
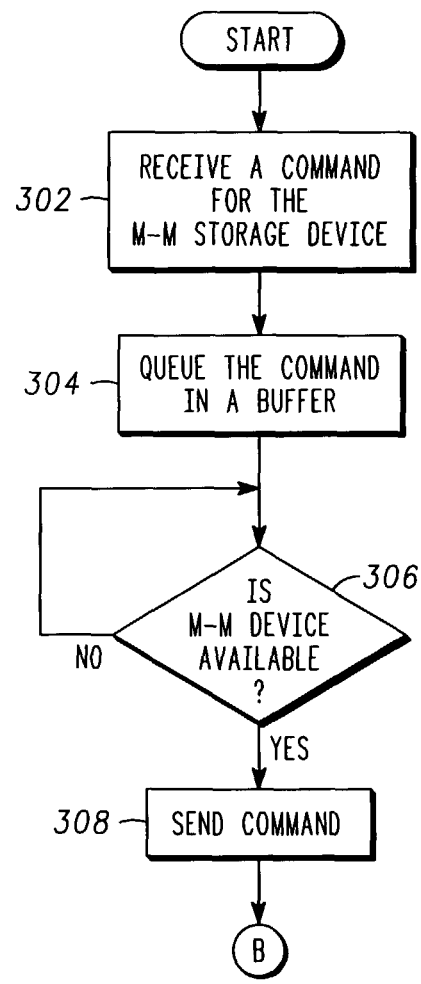
FIG. 3 shows one example of a block diagram depiction of a method for coupling a multi-media storage device to a personal communications device in accordance with one embodiment of the invention.

FIG. 3 shows a method of coupling a portable electronic device to a multi-media storage device 16.

At step 302, a multi-media device interface 18 will receive a command for the multi-media storage device 16. In step 304, the command to the multi-media storage device will be queued in a buffer until the multi-media storage device 16 concludes executing a previously-issued command. By queuing the command to the multi-media storage device, the portable electronic device can perform other tasks instead of waiting until the multi-media storage device is available.

In step 306, the conditions for sending a queued command are tested. When the multi-media storage device 16 is able to execute the command issued to it, as determined by monitoring the data from or to the multi-media storage device 16, a queued command is sent to the multi-media storage device 16 in step 308.

Figure 4:
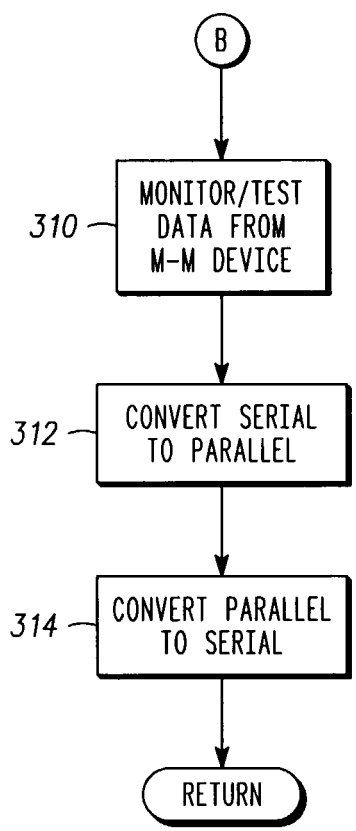
FIG. 4 shows the continuation of one example of a block diagram depiction of a method for coupling a multi-media storage device to a personal communications device in accordance with one embodiment of the invention.

At step 310 in FIG. 4, the execution of the command by the multi-media storage device 16 is monitored and/or tested by the multi-media device interface 18 by monitoring and/or testing data that is received by the multi-media device interface 18 from the multi-media device 16. The responses 38 received from the multi-media storage device 16 (sometimes embodied as the cessation thereof) will indicate when a previously-issued command is completed. In step 308, part of the testing of data from the multi-media storage device 16 is the testing integrity is to insure that data from the multi-media storage device 16 is received intact, which in some embodiments is by way of checksums added to streams of data, parity bits added to data bytes or cyclic redundancy checks, all of which are considered to be equivalent embodiments of data integrity testing.

Data is transferred to and from the multi-media device in a serial fashion. The portable electronic device 10 on the other hand uses parallel data. Accordingly, in step 312, data that is received from the multi-media storage device 16, is converted to a serial form. Conversely, in step 314, data directed to the multi-media storage device 16 from the portable electronic device 10 is converted from a parallel format.

Those of skill in the art will appreciate that by coupling a portable electronic device 10, such as a portable phone, pager, or personal digital assistant to a multi-media storage device through an intelligent controller or interface, the processing power of the portable communications device can be freed to perform other tasks with the multi-media device interface monitoring the status of commands and the availability of the multi-media storage device to respond.

Figure 6:
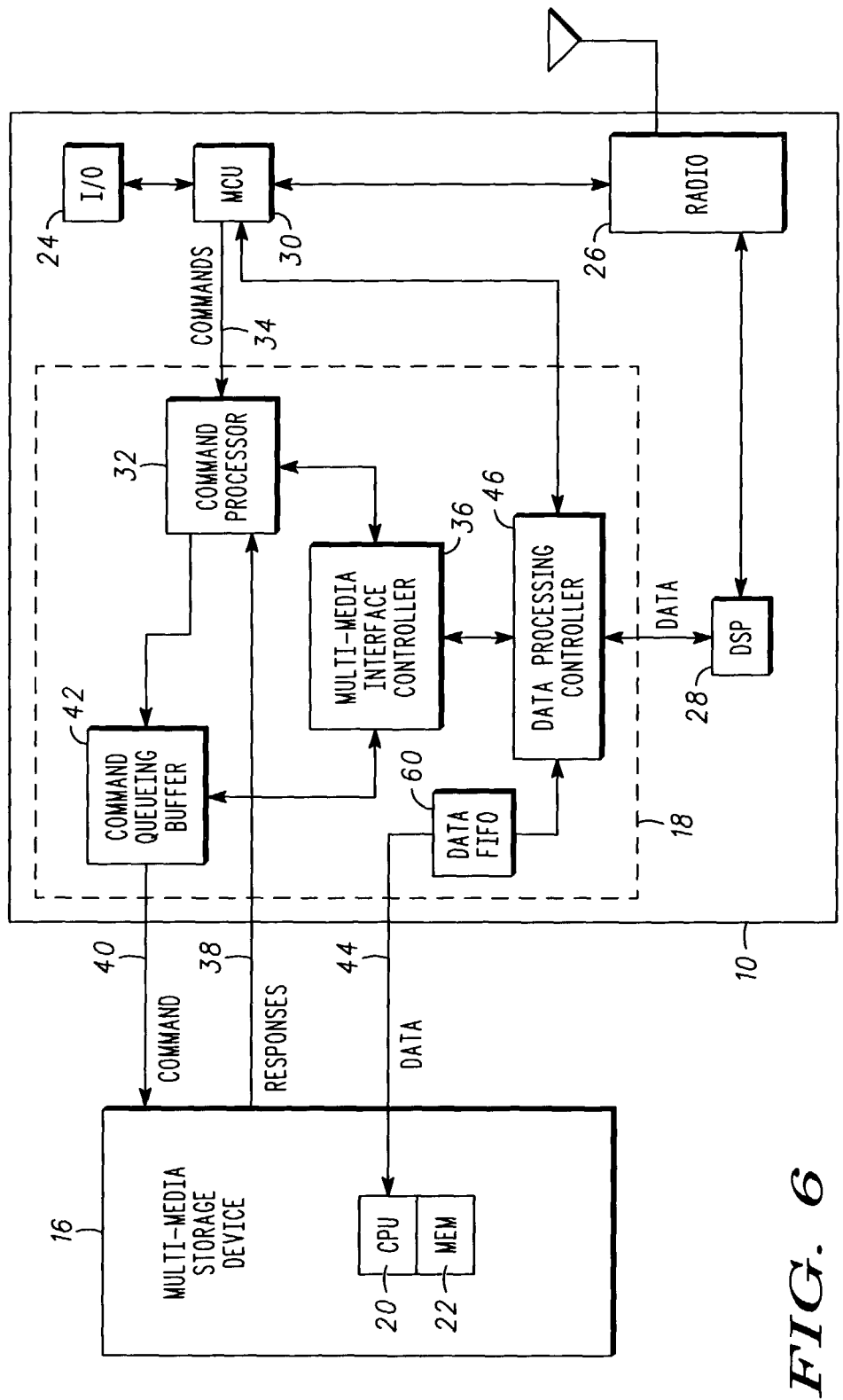
FIG. 6 shows another example of a portable electronic device and a multi-media storage device in accordance with one embodiment of the invention.

One complication to be overcome for providing data transfer in a streaming mode between the multi-media storage device 16 and the portable electronic device 10 is the synchronization of the data 44 with respect to a stop data transmission command 40. FIG. 6 illustrates one embodiment for overcoming such synchronization problems by the inclusion of a data FIFO 60 operably coupled between the data processing controller 46 and the CPU 20 of the multi-media storage device 16. As recognized by one having ordinary skill in the art, the data FIFO 60 may be any suitable type of memory device capable of storing data transmission, but one embodiment may be a first in first out memory buffer for providing the transfer of data 44 therethrough.

The portable device 10 operates as discussed above with respect to FIG. 2, but further includes the ability to store a predetermined number of data packets within the data FIFO 60 for synchronizing data transfer. Furthermore, the data processing controller 46 is operably coupled to the first processor 30 for providing data 62 to the data processing controller 46. During the writing of data 44 to the multi-media storage device 16, synchronization must be achieved by providing for a reserve of a predetermined number of data packets, typically a data byte, for synchronization with the stop data transmission command, such as command 40, provided from a command queuing buffer 42. It is further recognized that the multi-media interface controller 36 may provide the stop data transmission command which may be generated by the command processor 32. Regardless thereof, once the electronic portable device 10 generates a stop data transmission command, in one embodiment, six more bytes of write data must be transferred to the multi-media storage device. Therefore, the data processing controller 46 provides for the predetermined number of data packets, in this embodiment the predetermined number of data packets is seven bytes of data, to be stored in the data FIFO 60.

The data buffer 60 is operatively coupled to the data processing controller 46 such that the data buffer 60 may receive the write data from the data processing controller and provide the write data to the multimedia storage device in synchronization with the stop data transmission command.

Figure 7:
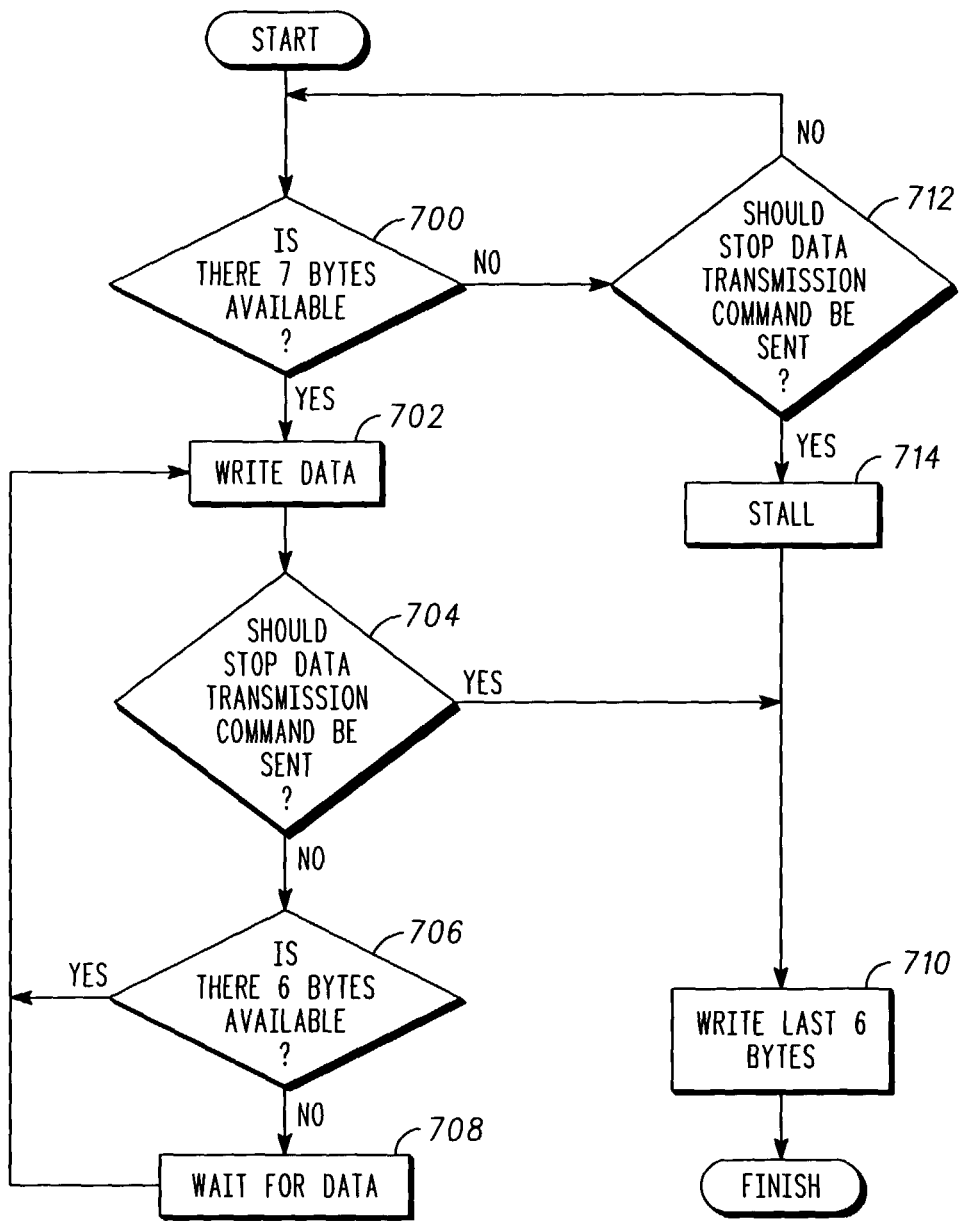
FIG. 7 shows one example of a block diagram depiction of a method for synchronizing data transfer between a portable electronic device and a multi-media storage device.

While FIG. 6 illustrates one embodiment of the structural representation of the portable device 10 having the data FIFO 60 for synchronization of a write data transfer, FIG. 7 illustrates one example of the steps of operation of the processor 10. A first determination is made if there are seven bytes available within the data FIFO 60, step 700. If there are seven or more bytes available, the portable device 10 may thereupon write data 44 to the multi-media storage device 16, step 702. Another determination is made as to whether a stop data transmission command should be sent to the multi-media storage device 16, step 704. In the event that a stop data transmission command should not be sent, another determination is made as to whether there are six bytes of data available from the data FIFO 60, step 706.

If there are six bytes available in the data FIFO 60, the next step is to once again write data 44 to the multi-media storage device 16, step 702. If there are less than six bytes available in the data FIFO 60, the portable electronic device 10 should thereupon wait for data, step 708. Once the data 44 has been written to the multi-media storage device 16, step 702, the determination step 704 is repeated. In the event that a stop data transmission command should be sent, the portable electronic device 10 should thereupon write the last six bytes from the data FIFO 60 to the multi-media storage device 16. In one embodiment, the stop data transmission command includes 48 bits of command data, designated as element 40 in FIG. 6, including a start bit, such as a "0" bit, a transmitter bit, such as a "1" bit, content bits that include 38 bit representing the command, an error correction code block of seven bits and an end bit, such as a "1" bit.

Referring back to step 700, if there are less than seven bytes available in the data FIFO 60, a determination should be made as to whether a stop data transmission command should be sent 712, similar to step 704. If the determination is that a stop data transmission command should not be sent, the determination of step 700 is once again repeated to determine if there are seven data bytes available in the data FIFO 60. Otherwise, if a stop data transmission command should be sent and there are less than seven bytes available, the electronic portable device 10 should thereupon stall the write operation until enough of the command has been sent to the end of the data and the end of the command are synchronized. As a packet of data 44 is transmitted at the same time that a stop data transmission command is provided to the multi-media storage device, the final step includes writing the last six bytes from the data FIFO 60 to the multi-media storage device 16, step 710. As such, in one embodiment, at least 49 data bits are written to the multi-media storage device 16, corresponding to the 48 command bits included within the host command and a final data bit transmitted concurrently with a high impedance state command bit, such as a "1" bit.

Thereupon, through the utilization of a data FIFO 60, the portable electronic device 10 may effectively synchronize a write data transfer within the multi-media storage device 16 without the use of a DMA to coordinate the timing required by having a final six data bytes provided to the multi-media storage device 16 upon reception of the stop data transmission command. Furthermore, through the utilization of the data FIFO 60, the portable electronic device 10 further does not need to monitor or track the data transfer after the predetermined number of data bits is reserved within the data FIFO, and may effectively transfer data on a first in first out manner to the multi-media storage device 16.

While the principles of the invention have been described above in on with specific apparatus, it is to be clearly understood that this description only by way of example and not as a limitation on the scope of the invention.

What is claimed is:

1. A portable electronic device, couplable to a multi-media storage device having a processor therein that executes commands, comprising:

a multi-media device interface located within the portable electronic device and comprising:
   a command processor, external to the multi-media storage device and within the portable electronic device, operative to: receive commands executable by the multi-media storage device from a controller within the portable electronic device; and forward the commands to the multi-media storage device operatively couplable to the portable electronic device;
   a command queuing buffer, in the portable electronic device, operably coupled to the command processor and capable of being coupled to the multi-media storage device, the command queuing buffer operative to store commands executable by the multi-media storage device sent from the controller within the portable electronic device;
   a multi-media interface controller, in the portable electronic device, operably coupled to the command processor and to the command queuing buffer, the multi-media interface controller operative to identify commands from the portable electronic device to be stored in the command queuing buffer and operative to control when commands are sent to the multi-media storage device from the command query buffer.

2. The portable electronic device of claim 1 wherein the portable electronic device is a cellular telephone transceiver, an MP3 player, a personal digital assistant, a two-way radio, a two-way pager, a digital camera, or an Internet appliance.

3. The portable electronic device of claim 1 wherein the multi-media interface controller includes a processor capable of: directly sending a command to the multi-media storage device; and sending a command to the multi-media storage device that was queued in the command queuing buffer.

4. The portable electronic device of claim 3 further comprising a data buffer operably coupled to a data processing controller such that the data buffer may receive the write data from the data processing controller and provide the write data to the multi-media storage device in synchronization with a stop data transmission command.

5. The portable electronic device of claim 4, wherein the synchronization with the stop data transmission command comprises providing a predetermined reserve number of data packets, the predetermined reserve number of data packets comprising a data byte.

6. The portable electronic device of claim 1 wherein the command processor performs at least one of the functions that include:
   adding a cyclic redundancy check to the commands from the portable electronic device;
   detecting an error correction code in responses from the multi-media storage device;
   receiving responses from the multi-media storage device;
   validating responses from the multi-media storage device; and
   notifying the portable electronic device that a response was received from the multi-media storage device.

7. The portable electronic device of claim 1 wherein the command queuing buffer is a shift register.

8. The portable electronic device of claim 1 wherein the multi-media interface controller is a controller that tracks the execution of commands sent to the multi-media storage device by the portable electronic device.

9. The portable electronic device of claim 1 further including a data processing controller, operatively coupling the multi-media storage device to the controller within the portable electronic device.

10. The portable electronic device of claim 1 further including a data processing controller, operatively coupling the multi-media storage device to the controller within the portable electronic device, the data processing controller being programmed to convert serial data to parallel data.

11. The portable electronic device of claim 10, wherein the controller is further configured to convert parallel data to serial data.

12. The portable electronic device of claim 1 further including a data processing controller, operatively coupling the multi-media storage device to the controller within the portable electronic device, the data processing controller controlling the transfer of data between the portable electronic device and the multi-media storage device coupled to the data processing controller.

13. The portable electronic device of claim 1 wherein signals are exchanged between the portable electronic device and the multi-media storage device via electrical signals, infrared signals, optical signals, acoustic signals, or radio frequency signals.

14. The portable electronic device of claim 1, wherein the multi-media storage device comprises a circuit card or a multi-media card constructed according to the standards of the Multi-Media Card Association or the SD Association.

15. The portable electronic device of claim 1, wherein the multi-media storage device is configured to store pictures, video streams, or MP3 audio files for playback on the portable electronic device.

16. The portable electronic device of claim 1 further comprising a radio device operatively coupled to the command processor and operative to provide two-way communications capability for the portable electronic device.

17. The portable electronic device of claim 16, wherein the radio device includes a cellular telephone transceiver.

18. The portable electronic device of claim 1, wherein the command processor is a digital signal processor, a microprocessor, or a microcontroller.

19. The portable electronic device of claim 1, wherein the portable electronic device is configured to process parallel data.

20. The portable electronic device of claim 1, wherein the multi-media storage device is configured to process serial data.

* * * * *